June 13, 1967 G. DE COYE DE CASTELET 3,324,968
SOUND ATTENUATING ARRANGEMENT FOR PASSENGER
COMPARTMENT OF AUTOMOBILE
Filed May 3, 1966

United States Patent Office 3,324,968
Patented June 13, 1967

3,324,968
SOUND ATTENUATING ARRANGEMENT FOR PASSENGER COMPARTMENT OF AUTOMOBILE
Gaëtan de Coye de Castelet, Billancourt, France, assignor to Regie Nationale des Usines Renault, Billancourt, Seine, France
Filed May 3, 1966, Ser. No. 547,326
Claims priority, application France, May 17, 1965, 17,333, Patent 1,444,097
1 Claim. (Cl. 181—36)

Most objectionable sound resonances in automotive vehicles are produced within the 100 to 150 Hz. waveband. One of the main causes of this state of things is that the dimensions of the passenger compartments of vehicles permit the development of stationary waves within this frequency band, which reinforce the acoustic effect of vibration, even if of moderate amplitude, panels or frame structure elements.

An efficient method of avoiding these resonances consists in preventing or reducing the formation of stationary waves.

Considering the frequency of the vibration to be damped out (and also the corresponding wavelength) it is scarcely possible to avoid the reflection of sound waves by using only conventional sound-proofing materials; one method of damping out these stationary waves consists in providing damping devices having sufficient volume and dimensions in proportion to the passenger compartment and to the wavelength of the detrimental sound resonances to be eliminated.

The method according to this invention consists in causing an appendant volume of adequate dimensions to be connected through suitably calibrated orifices with the passenger compartment; as a rule, sound absorbing or damping means of this general character may advantageously utilize the luggage boot of the vehicle. To this end, one of the partitions separating the boot from the passenger compartment has preferably regularly spaced holes formed therethrough and is lined with a layer of porous material serving the essential purposes of:

retarding the air flow through the holes;
absorbing the high-frequency noise likely to be generated in the luggage boot;
improving the general appearance of the assembly.

In order to afford a clearer understanding of this invention the manner in which the same may be carried out in practice will now be described with reference to the accompanying drawing, in which.

Figure 1:
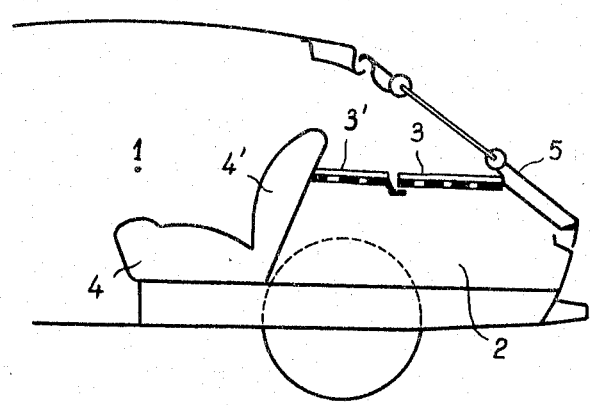
FIGURE 1 is a longitudinal diagrammatic section showing the rear portion of a vehicle wherein the luggage boot is separated from the passenger compartment by a set of movable trays.

In FIGURE 1, the passenger compartment 1 and the luggage boot are separated from each other by two horizontal trays or plates 3 and 3', detachable or not, and by the rear seat 4 and its back rest 4'.

The boot 2 and passenger compartment 1 are accessible through a rear door 5.

Figure 2:
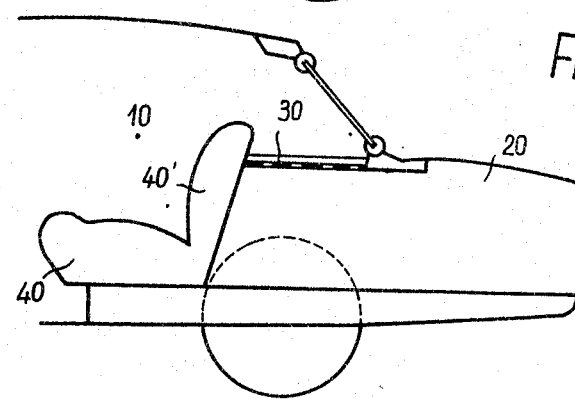
FIGURE 2 is a longitudinal section showing in diagrammatic form the rear portion of a vehicle of which the luggage boot and the passenger compartment are separated by a fixed horizontal partition.

In FIGURE 2, the passenger compartment 10 and boot 20 are separated by a horizontal tray 30, the rear seat 40 and its back 40'.

Figure 3:
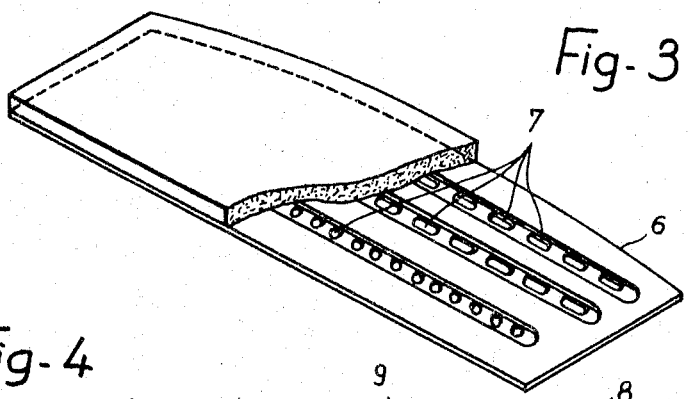
FIGURE 3 is a fragmentary perspective section showing the partition provided between the luggage boot and the passenger compartment according to a typical form of embodiment of the invention.
Figure 4:
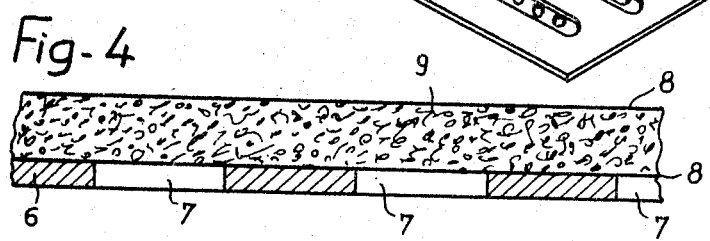
FIGURE 4 is a diagrammatic section showing this partition comprising a porous lining.

According to this invention, the partitions 3, 3' and 30 consist each of a rigid support 6 (see FIGURE 3) in the form of a panel in which preferably spaced holes 7 are formed to constitute about 1/10 of the surface area of this panel. The support 6 is lined (FIGURE 4) on the compartment side with a flexible porous material 9 sandwiched between two sheets of similarly porous material 8.

These holes 7 provide a communication between the compartment and the boot, and the porous materials 8 and 9 retard the air flow through these holes while preventing the smells from the boot to propagate to the passenger compartment.

On the other hand, this lining is capable of absorbing high-frequency noises likely to be produced in the boot region by water splashes or gravel projections.

Finally, the flexible porous material 8 may be selected with a view to meet decorative or aesthetic requirements.

The addition of the passenger compartment to the auxiliary volume consisting of the luggage boot, and the interposition of a partition partially pervious to sound vibration between these two volumes ensures at the same time a modification of the location of the trough of the stationary or standing wave vibration and a considerable reduction in the vibration amplitude, thus avoiding the sound resonances detrimental to the passengers' comfort.

What is claimed is:

In an automobile vehicle having a passenger compartment and a trunk compartment, said compartments being separated by a rear seat, a partitioning element extending horizontally from the back of the seat and forming at least a portion of the top wall of the trunk compartment, a means for damping out sound resonances in the passenger compartment comprising a panel forming said partitioning element and having therein a plurality of uniform regularly spaced holes, the total area of said holes being approximately a tenth of the panel surface area, a flexible porous sound absorbing material covering the compartment side of said panel, said holes and said material providing sound wave communication between the passenger compartment and the trunk compartment thereby damping detrimental sound resonances.

References Cited

UNITED STATES PATENTS 2,077,262  4/1937  Prudden _____ 296—39.1
2,455,926  12/1948  Gessler et al.
3,092,204  6/1963  Powers _____ 181—36.4

FOREIGN PATENTS 206,535  4/1956  Australia.
531,798  10/1956  Canada.
547,266  10/1957  Canada.

RICHARD B. WILKINSON, Primary Examiner.
R. S. WARD, Assistant Examiner.